United States Patent
Kida et al.

(10) Patent No.: US 8,848,230 B2
(45) Date of Patent: Sep. 30, 2014

(54) IMAGE FORMING APPARATUS AND IMAGE FORMING SYSTEM

(75) Inventors: Yasuhiko Kida, Osaka (JP); Hideaki Shimizu, Osaka (JP)

(73) Assignee: Kyocera Document Solutions Inc. (JP)

( * ) Notice: Subject to any disclaimer, the term of this patent is extended or adjusted under 35 U.S.C. 154(b) by 315 days.

(21) Appl. No.: 13/307,187

(22) Filed: Nov. 30, 2011

(65) Prior Publication Data

US 2012/0133987 A1   May 31, 2012

(30) Foreign Application Priority Data

Nov. 30, 2010   (JP) ................................ P2010-267386

(51) Int. Cl.

| | |
|---|---|
| *G06K 15/00* | (2006.01) |
| *B41J 5/30* | (2006.01) |
| *G06K 15/02* | (2006.01) |
| *H04N 1/00* | (2006.01) |
| *H04N 1/21* | (2006.01) |
| *G03G 21/00* | (2006.01) |
| *G06F 3/12* | (2006.01) |

(52) U.S. Cl.
CPC ............... *B41J 5/30* (2013.01); *G06K 15/1856* (2013.01); *H04N 1/00* (2013.01); *G06K 15/1814* (2013.01); *H04N 1/21* (2013.01); *G06K 15/1817* (2013.01); *G03G 21/00* (2013.01)
USPC ......................................... 358/1.16; 358/1.15

(58) Field of Classification Search
CPC .................................................. G06K 15/1856
See application file for complete search history.

(56) References Cited

U.S. PATENT DOCUMENTS

| | | | | |
|---|---|---|---|---|
| 4,949,190 | A | * | 8/1990 | Thompson .................... 358/1.17 |
| 7,130,069 | B1 | | 10/2006 | Honma ......................... 358/1.15 |
| 7,206,092 | B2 | | 4/2007 | Honma ......................... 358/1.15 |
| 2006/0197981 | A1 | | 9/2006 | Honma ......................... 358/1.15 |
| 2006/0290693 | A1 | | 12/2006 | Zhou et al. .................... 345/420 |
| 2008/0174818 | A1 | | 7/2008 | Kanamoto ................... 358/1.15 |

FOREIGN PATENT DOCUMENTS

| | | |
|---|---|---|
| JP | 2007-004683 | 1/2007 |
| JP | 2008-181239 | 8/2008 |
| JP | 2010-030309 | 2/2010 |

* cited by examiner

*Primary Examiner* — Dov Popovici
(74) *Attorney, Agent, or Firm* — Ostrolenk Faber LLP

(57) ABSTRACT

An image forming apparatus includes: an operation unit; an image forming unit; a control unit making the image forming unit perform an image formation; a data acquisition unit obtaining an image formation object data; a data conversion unit converting the image formation object data to an image formation format data; and a plurality of memory regions storing the image formation format data, wherein when the data acquisition unit obtains the image formation object data, the control unit makes the data conversion unit convert the image formation object data to the image formation format data, makes each of the plurality of memory regions store each of the image formation format data, and, when the operation unit receives an image formation instruction, makes the image forming unit perform an image formation, in a predetermined order, of the image formation format data stored in the plurality of memory regions.

2 Claims, 6 Drawing Sheets

IMAGE FORMING APPARATUS AND IMAGE FORMING SYSTEM

BACKGROUND OF THE INVENTION

The present application claims priority on Japanese Patent Application No. 2010-267386, filed Nov. 30, 2010, the content of which is incorporated herein by reference.

FIELD OF THE INVENTION

The present invention relates to an image forming apparatus and an image forming system.

DESCRIPTION OF THE RELATED ART

In recent years, informational data including images and letters are transmitted using a communication network such as an internet. A technology is utilized such that a displaying device displays an information based on the transmitted informational data. This displaying device may display the same information such as television and newspapers. In addition, the displaying device may switch over information according to the place at which the displaying device is installed, and according to time zone. Therefore, the display device may display information in an effective manner to a particular target audience. Furthermore, the display device may be switched over easily as an informational data stored in a transmission source (transmission server) is updated. Therefore, the process of switching over the display device is not cumbersome.

A method to output information as described above is to display information on the displaying device. Another method to output information is to make a multi functional peripheral such as an image forming apparatus print out the information. For example, at retail outlets such as convenience stores and the like, an image forming apparatus and a server (information processing device) are installed. This information processing device stores informational data transmitted from the transmission server. When the image forming apparatus receives an output instruction, the image forming apparatus forms an image of the informational data to a blank space of a paper on which an output image is already attached, or, to a back side of the paper.

However, according to the conventional technology described above, when an image forming apparatus forms an image of a piece of information in a continuous manner, there is a problem in that a preparation of the informational data does not catch up. Therefore, a waiting time occurs for the image formation on each sheet of paper. Moreover, it takes time for the image formation of the information to be completed. In this way, since it takes time for the image forming apparatus to complete the image formation, a user often must wait for a long period of time.

The present invention is made according to the considerations described above. An object of the present invention is to shorten the time spent on forming an image.

SUMMARY OF THE INVENTION

In order to achieve the above object, the present invention employs the following.

Namely, an image forming apparatus according to an aspect of the present invention includes: an operation unit receiving an operation instruction; an image forming unit performing an image formation; a control unit making the image forming unit perform an image formation when the operation unit receives an image formation instruction; a data acquisition unit obtaining an image formation object data; a data conversion unit converting the image formation object data to an image formation format data; and a plurality of memory regions storing the image formation format data. Here, when the data acquisition unit obtains the image formation object data, the control unit makes the data conversion unit convert the image formation object data to the image formation format data. In addition, the control unit makes each of the plurality of memory regions store each of the image formation format data. When the operation unit receives an image formation instruction, the control unit makes the image forming unit perform an image formation, in a predetermined order, of the image formation format data stored in the plurality of memory regions.

In addition, an image forming system according to an aspect of the present invention includes: an information processing device; and an image forming device communicating with the image processing device and including a plurality of memory regions storing an image formation format data. Here, when the information processing device obtains an image formation object data, the information processing device converts the image formation object data to the image formation format data and outputs the image formation format data to the image forming device. In addition, when the image forming device obtains the image formation format data from the information processing device, the image forming device makes each of the plurality of memory regions store each of the image formation format data. When the image forming device receives an image formation instruction, the image forming device performs an image formation, in a predetermined order, of the image formation format data stored in the plurality of memory regions.

EFFECT OF THE INVENTION

According to the present invention, a method of storing an image formation format data individually to each of a plurality of memory regions, a method of making a conversion to a first image formation format data based on an image formation target data and making a conversion to a second image formation format data based on a portion of an image formation target data, and a method of storing a fixed image formation format data in advance to a second memory region, are executed in combination or in a singular form. As a result, it is possible to reduce the amount of time spent to form an image.

DETAILED DESCRIPTION OF THE PREFERRED EMBODIMENTS

Hereinafter, an embodiment of the present invention is described with reference to the attached diagrams.

Figure 1:
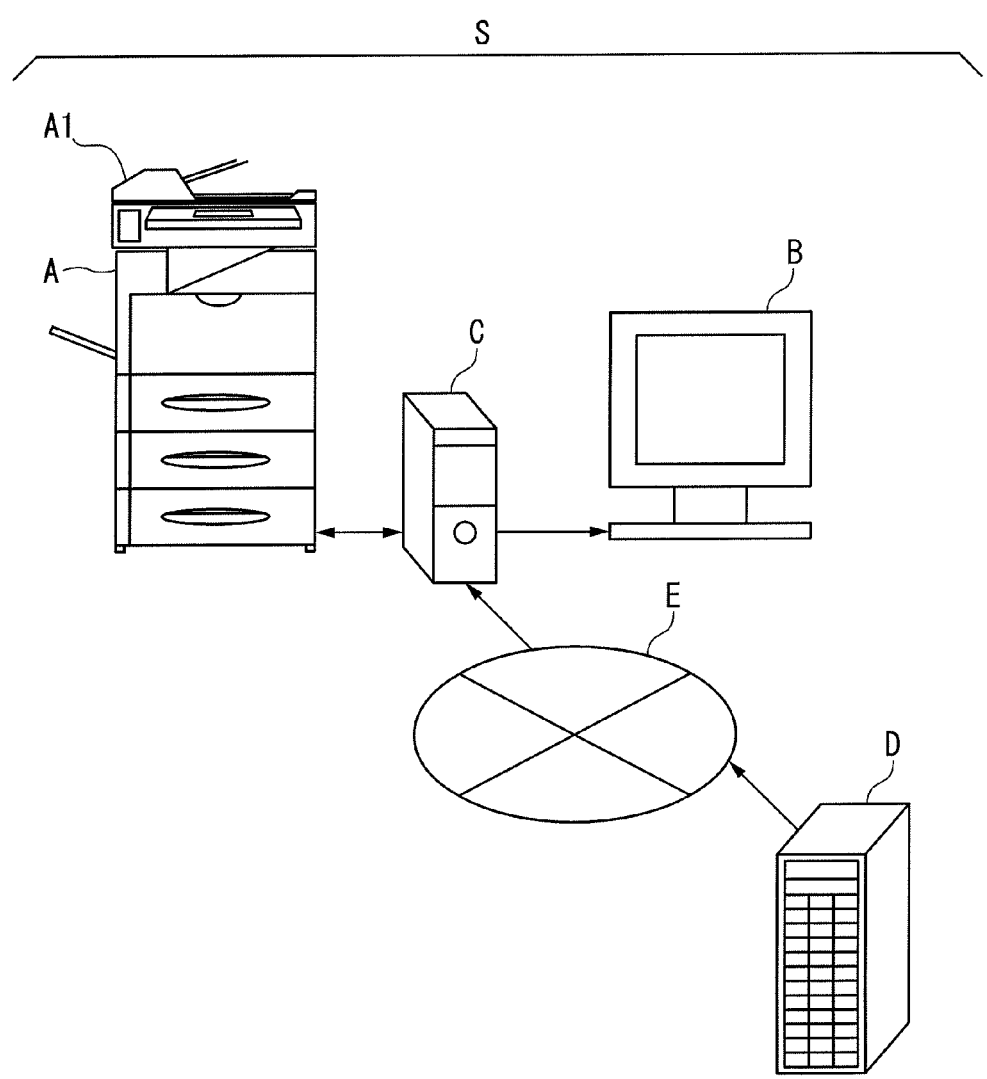
FIG. 1 is a system configuration diagram of an image formation system S according to an embodiment of the present invention.

As shown in FIG. 1, an image formation system S according to an embodiment of the present invention includes a multi functional peripheral (image formation apparatus) A, a displaying device B, an information processing device C, a transmission server D, and a transmission network E.

The multi functional peripheral A has both a copying feature, a printing feature, a scanning feature, and a facsimile transmitting/receiving feature. The multi functional peripheral A is connected to the information processing device C. The multi functional peripheral A performs an image formation based on a data inputted from the information processing device C.

An example of the displaying device B is a liquid crystal display. The displaying device B is connected to the information processing device C. The displaying device B displays information based on informational data inputted from the information processing device C.

A communication connection is established between the information processing device C and the multi functional peripheral A, and between the information processing device C and the displaying device B. Furthermore, a communication connection is established between the information processing device C and the transmission server D via the transmission network E. The information processing device C stores information data (image formation target data) received from the transmission server D. Furthermore, the information processing device C makes the multi functional peripheral A perform an image formation based on the informational data. In addition, the information processing device C may be a computer which makes the displaying device B display information.

The transmission server D is a server installed to transmit informational data in a PDF format, a JPEG format, and the like. The transmission server D is connected via the transmission network E to the information processing device C and another information processing device (not shown). The informational data is updated as needed. The transmission server D transmits the informational data to the information processing device C and the other information processing device.

Examples of the transmission network E include a local area network and a public internet. The transmission network E connects the information processing device C and the transmission server D. In this way, the transmission network E serves as a signal transmission path of the transmission between the information processing device C and the transmission server D.

Next, a configuration of a multi functional peripheral A of the image formation system S is described with reference to FIG. 2.

Figure 2:
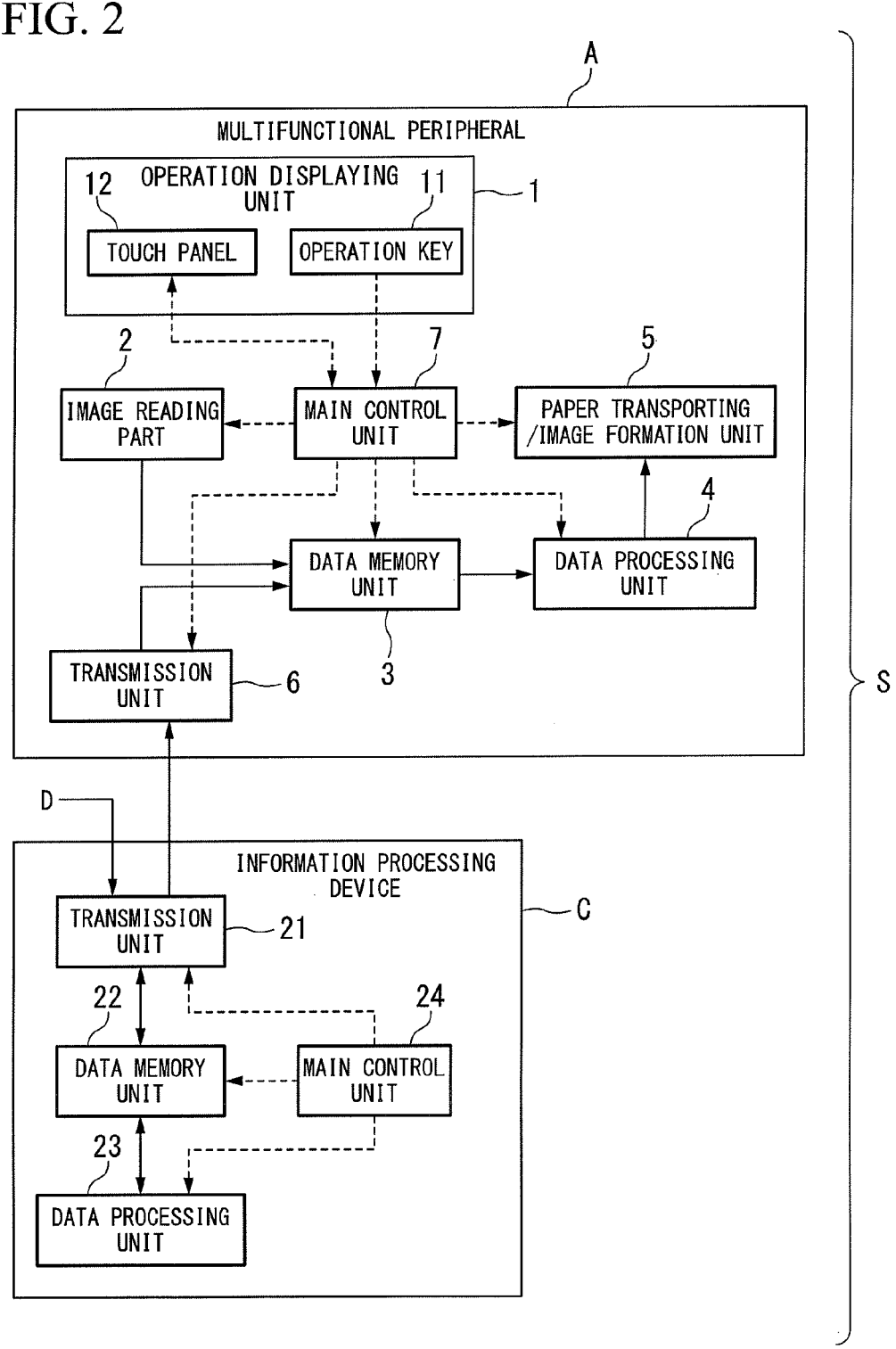
FIG. 2 is a functional block diagram of a multi functional peripheral A and an information processing device C of an image formation system S according to an embodiment of the present invention.

As shown in FIG. 2, the multi functional peripheral A includes an operation displaying unit (operation unit) 1, an image reading unit 2, a data memory unit 3, a data processing unit (data conversion unit) 4, a paper transporting/image formation unit (image formation unit) 5, a transmission unit (data acquisition unit) 6, and a main control unit (control unit) 7.

The operation displaying unit 1 includes an operation key 11 and a touch panel 12. The operation displaying unit 1 is a man-machine-interface relating a user with the multi functional peripheral A. The operation displaying unit 1 receives an operational instruction according to a pressed operation key 11 or an operation button displayed on the touch panel 12. In addition, the operation displaying unit 1 outputs the operational instruction to the main control unit 7. Further, the operation displaying unit 1 displays various screens on the touch panel 12 based on a command signal of the main control unit 7.

The image reading part 2 uses a line sensor to perform a reading of an image (draft image) of a draft, automatically supplied by an automatic draft feeding device A1, or an image (draft image) of a draft placed on a platen glass. The image reading part 2 performs the reading based on a control signal inputted by the main control part 7. Further, the image reading unit 2 converts the draft image that it read into a draft image data. Moreover, the image reading unit 2 outputs this draft image data to the data memory unit 3.

Examples of the data memory unit 3 include a semiconductor memory or a hard disk device. Examples of data stored by the data memory unit 3 include a draft image data based on a command signal inputted from the main control unit 7, a PDL (Page Description Language) format data inputted from the image processing device C, a first bit map image data or a bit map image data of an image formation format (image formation format data or a first image formation format data) converted from a PDL format data at a data processing unit 4 described later, a text data inputted from the information processing device C, a second bit map image data (a second image formation format data) converted from the text data at the data processing unit 4, a fixed bit map image data (fixed image formation format data), and the like. The data memory unit 3 reads out these data, and outputs these data to the data processing unit 4.

Figure 3:
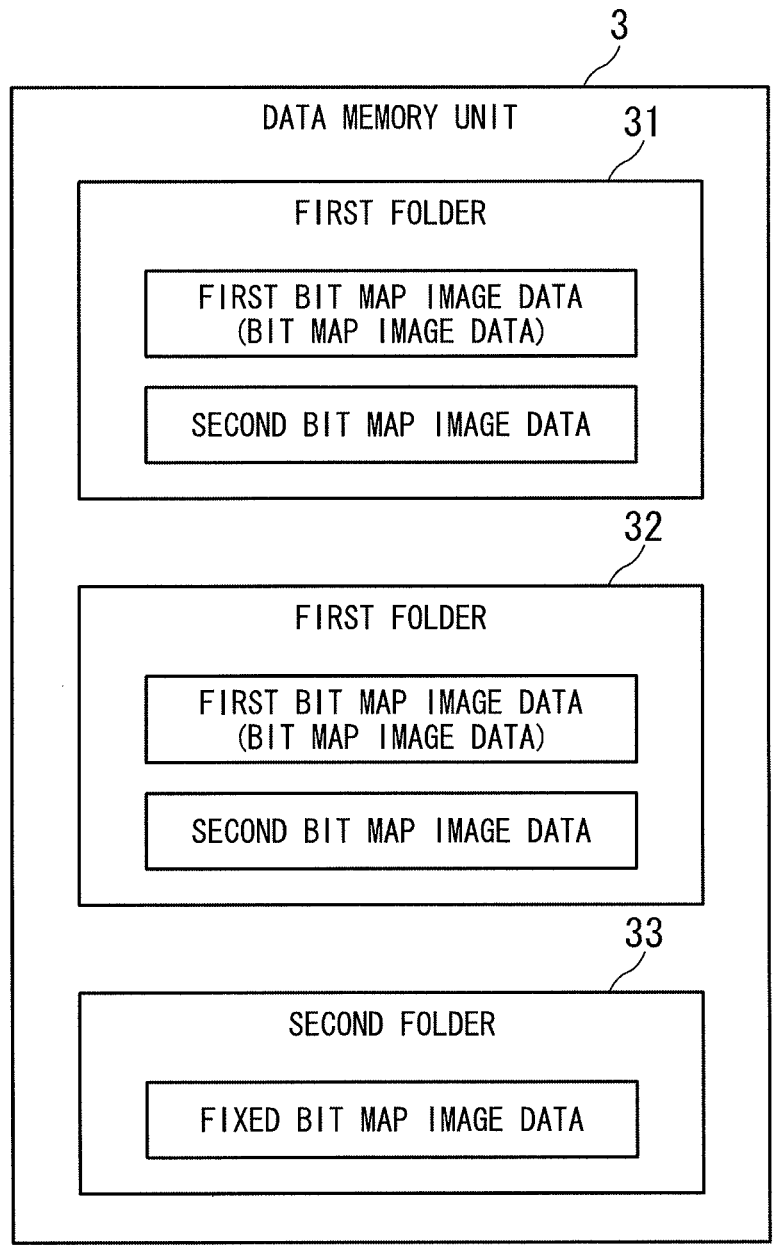
FIG. 3 is a folder configuration diagram of a data memory unit 3 of a multi functional peripheral A of an image formation system S according to the above embodiment.

As shown in FIG. 3, a first folder 31, 32, and a second folder 33 are provided in the data memory unit 3. The first folder 31, 32 store a first bit map image data (or a bit map image data) or a second bit map image data, and the like. The first bit map image data (or a bit map image data) and the second bit map image data are each converted from one informational data. Further, a fixed bit map image data is stored in advance in the second folder 33.

The data processing unit 4 performs various image processing operations (for instance, an image process according to an enlargement or a shrinkage copying) on the draft image data inputted from the data memory unit 3. The data processing unit 4 performs the various image processing operations based on a control signal inputted from the main control unit 7. At the same time, the data processing unit 4 converts the draft image data to a bit map image data with an image processing format. In other words, the data processing unit 4 converts an RGB image data (color image data) according to the three primary colors of light to an YMCK image data having a standard color of Y (yellow), M (magenta), C (cyan), and K (black). Further, the data processing unit 4 outputs this YMCK image data to the paper transporting/image formation unit 5. In addition, the data processing unit 4 converts the text data and the PDL format data inputted from the data memory unit 3 to a bit map image data of an image formation format based on a control signal inputted from the main control unit 7. Moreover, the data processing unit 4 outputs this bit map image data to the paper transporting/image formation unit 5.

The paper transporting/image formation unit 5 includes a print engine (a photoconductive drum, an electrostatically charged apparatus, a developing apparatus, a fixing roller, and the like), a paper feeding roller, a paper ejecting roller, and the like. The paper transporting/image formation unit 5 transports a recording paper from a sheet feeding cassette (not shown) based on a control signal of the main control unit 7. Further, the paper transporting/image formation unit 5 performs an image formation on a recording paper based on the bit map image data inputted from the data processing unit 4. Then, the paper transporting/image formation unit 5 ejects this recording paper to a paper ejecting tray (not shown).

The transmission unit 6 is connected to the information processing device C via a transmission cable. The transmission unit 6 performs a transmission with the information processing device C based on a control signal of the main control unit 7.

The main control unit 7 includes a CPU (Central Processing Unit), an ROM (Read Only Memory), an RAM (Random Access Memory), and an interface circuit which performs an input and output of the operation displaying unit 1, the image reading unit 2, the data memory unit 3, the data processing unit 4, the paper transporting/image formation unit 5, and the transmission unit 6. The main control unit 7 controls the entire operation of the multi functional peripheral A according to a control program stored in the ROM and an operation instruction inputted from the operation displaying unit 1. Incidentally, the control program stored in the ROM includes an image formation control program. The main control unit 7 controls an image forming operation based on the image formation control program.

Next, a configuration of the information processing device C is described with reference to FIG. 2.

As shown in FIG. 2, the information processing device C includes a transmission unit 21, a data memory unit 22, a data processing unit 23, and a main control unit 24.

The transmission unit 21 is connected to the multi functional peripheral A via a transmission cable. At the same time, the transmission unit 21 is connected to the transmission server D via the transmission network E. The transmission unit 21 communicates with the multi functional peripheral A and the transmission server D based on a control signal of the main control unit 24.

Examples of the data memory unit 22 include a semiconductor memory and a hard disc device. The data memory unit 22 stores informational data obtained by the transmission unit 21 from the transmission server. Further, the data memory unit 22 reads out this informational data and outputs the informational data to the data processing unit 23. Further, the data memory unit 22 stores the PDL format data and the text data, which were converted by the data processing unit 23 described later. Moreover, the data memory unit 22 reads out this PDL format data and the text data, and outputs the informational data to the transmission unit 21.

The data processing unit 23 converts the informational data inputted from the data memory unit 22 into a PDL format data based on a control signal inputted from the main control unit 24. At the same time, the data processing unit 23 converts only the letter information in the informational data into text data. At this time, the data processing unit 23 makes a conversion into PDL format data after making a conversion to text data based on informational data.

The main control unit 24 includes a CPU (Central Processing Unit), an ROM (Read Only Memory), an RAM (Random Access Memory), and an interface circuit and the like performing an input and output of a signal with the transmission unit 21, the data memory unit 22, and the data processing unit 23. The main control unit 24 controls the entire operation of the information processing device C according to a control program stored in the ROM. Incidentally, the control program stored in the ROM includes a PDL format data controlling program. The main control unit 24 controls the conversion processing of the PDL format data and the output processing of the PDL format data based on this PDL format data controlling program.

Next, an operation of the multi functional peripheral A and the information processing device C according to the image forming system S is described with reference to FIG. 4.

According to the information processing device C, when the transmission unit 21 obtains informational data from the transmission server D via the transmission network E, the main control unit 24 makes the data memory unit 22 store informational data (step S1). After step S1, the main control unit 24 makes the data processing unit 23 convert the informational data to a PDL format data (step S2). After step S2, the main control unit 24 makes the transmission unit 21 output the PDL format data to the multi functional peripheral A (step S3).

According to the multi functional peripheral A, when the transmission unit 6 obtains a PDL format data from the information processing device C, the main control unit 7 makes the data processing unit 4 convert each of a plurality of PDL format data to a bit map image data. Further, the main control unit 7 stores each of the bit map image data to each of the first folders 31, 32 (step S4).

After step S4, when the operation displaying unit 1 receives an output instruction (image formation instruction), the main control unit 7 makes the paper transporting/image formation unit 5 perform an image formation according to a predetermined sequence on a bit map image data stored in a plurality of the first folders 31, 32 (step S5).

In addition, when the operation display unit 1 receives an additional informational output instruction, the main control unit 7 makes the paper transporting/image formation unit 5 form a normal copied image on a front surface of a recording paper. At the same time, the main control unit 7 makes the paper transporting/image formation unit 5 form an image of the information on a back surface of the recording paper.

Figure 4:
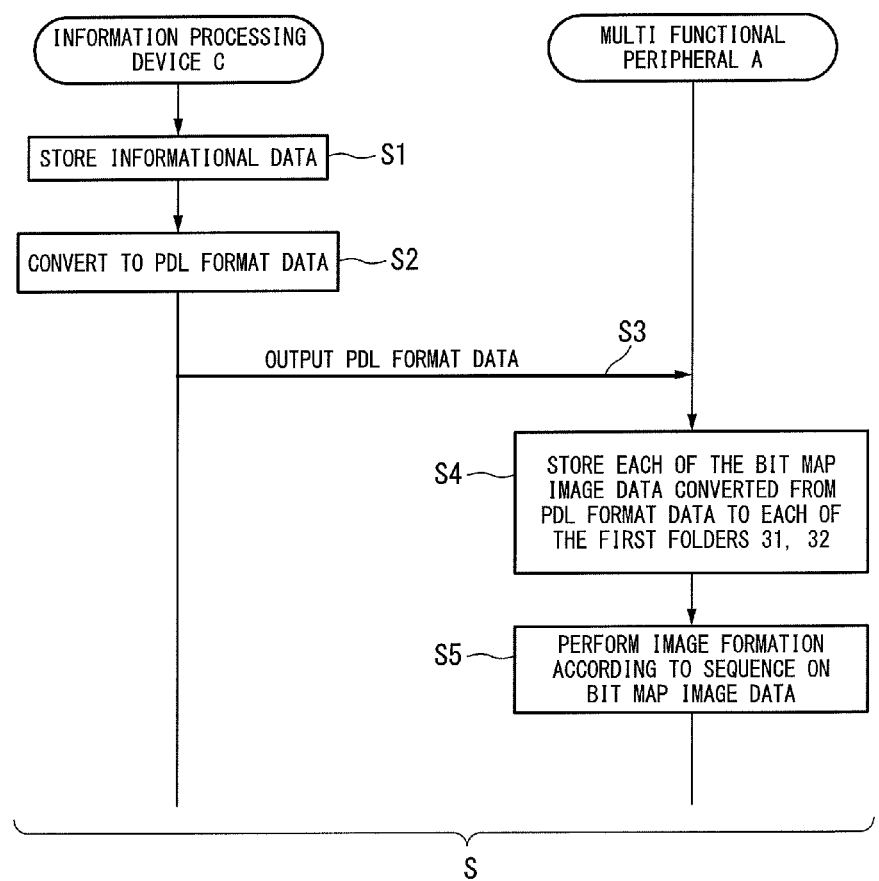
FIG. 4 is a sequential diagram showing an operation of an information processing device C and a multi functional peripheral A of an image formation system S according to the above embodiment.
Figure 5:
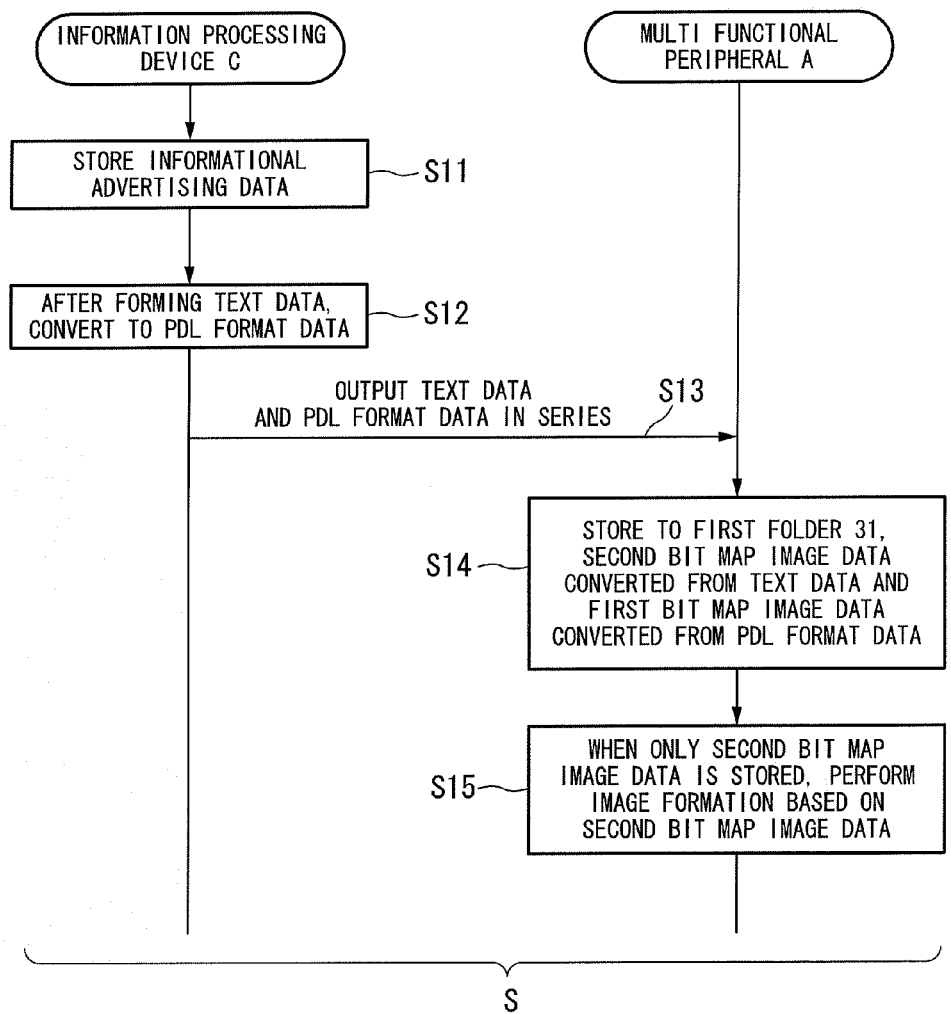
FIG. 5 is a sequential diagram showing a first variation of an operation of an information processing device C and a multifunctional peripheral A of an image formation system S according to the above embodiment.

Next, a variation of an operation shown in FIG. 4 is described with reference to FIG. 5.

According to the information processing device C, when the transmission unit 21 receives an informational data from the transmission server D via the transmission network E, the main control unit 24 makes the data memory unit 22 store the informational data (step S11). After step S11, the main control unit 24 makes the data processing unit 23 perform a conversion to text data based on the informational data, and, thereafter, perform a conversion to PDL format data (step S12). After step S12, the main control unit 24 makes the transmission unit 21 output the text data and the PDL format data in series to the multi functional peripheral A (step S13).

According to the multi functional peripheral A, when the transmission unit 6 receives text data from the information processing device C, the main control unit 7 makes the data processing unit 4 convert the text data to the second bit map image data. When the transmission unit 6 obtains PDL format data from the information processing device C, the main control unit 7 makes the data processing unit 4 convert the PDL format data to a first bit map image data. Further, the main control unit 7 makes the first folder 31 store a combination of the second bit map image data and the first bit map image data (when there are a plurality of combinations, store each of the combinations to each of the first folders 31, 32) (step S14). At this time, the text data is outputted from the information processing device C faster than the PDL format data. As a result, the text data is first converted to the bit map image data. In other words, compared to the first bit map image data, the second bit map image data is stored to the first folder 31.

After step S14, when the operation displaying unit receives an output instruction (image formation instruction), the main control unit 7 makes the paper transporting/image formation unit 5 perform an image formation based on the first bit map image data stored in the first folder 31. When only the second bit map image data is stored in the first folder 31, i.e., when a PDL format data is not yet obtained from the image processing device C, or when a conversion is not yet made to the first bit map image data, the main control unit 7 makes the paper transporting/image formation unit 5 perform an image formation based on this second bit map image data (step S15). Furthermore, when the operation displaying unit receives the additional information output instruction, the main control unit 7 makes the paper transporting/image formation unit 5 form a normal copying image on a front surface of a recording paper. At the same time, the main control unit 7 makes the paper transporting/image formation unit 5 form an image of the information on a back surface of the recording paper.

Figure 6:
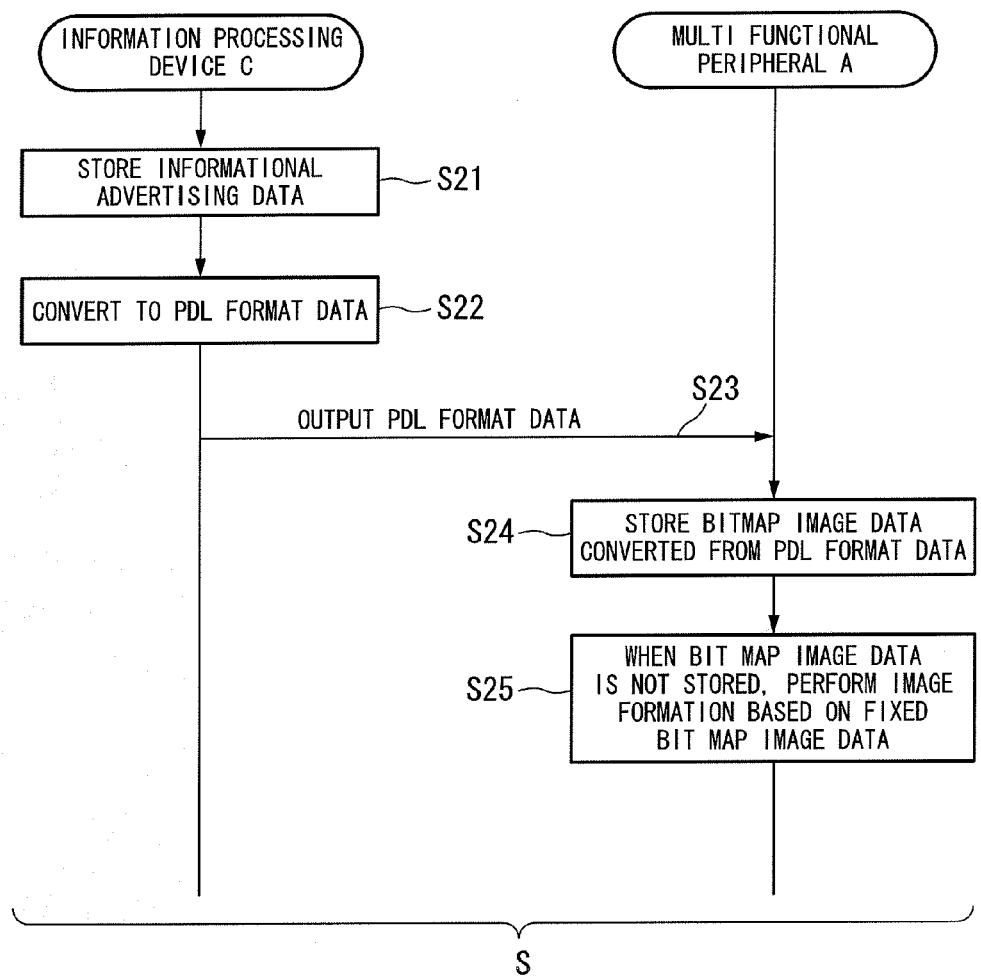
FIG. 6 is a sequential diagram showing a second variation of an operation of an information processing device C and a multi functional peripheral A of an image formation system S according to the above embodiment.

Next, a variation of the operation shown in FIG. 4 above is described with reference to FIG. 6.

According to the information processing device C, when the transmission unit 21 receives an informational data from the transmission server D via the transmission network E, the main control unit 24 makes the data memory unit 22 store the informational data (step S21). After step S21, the main control unit 24 makes the data processing unit 23 convert the informational data to PDL format data (step S22). After step S22, the main control unit 24 makes the transmission unit 21 output the PDL format data to the multi functional peripheral A (step S23).

According to the multi functional peripheral A, when the transmission unit 6 receives PDL format data from the information processing device C, the main control unit 7 makes the data processing unit 4 convert the PDL format data to a bit map image data. Further, the main control unit 7 makes the first folder 31 store the bit map image data (when there are a plurality of bit map image data, each of the bit map image data is stored to each of the first folders 31, 32) (step S24).

After step S24, when the operation displaying unit receives an output instruction (image formation instruction), the main control unit 7 makes the paper transporting/image formation unit 5 perform an image formation based on the bit map image data stored in the first folder 31. When a bit map image data is not stored in the first folder 31, i.e., when a PDL format data is not yet obtained from the image processing device C, or when a conversion is not yet made to the bit map image data, the main control unit 7 makes the paper transporting/image formation unit 5 perform an image formation based on a fixed bit map image data stored in the second folder 33 (step S25). Furthermore, when the operation displaying unit receives the additional information output instruction, the main control unit 7 makes the paper transporting/image formation unit 5 form a normal copying image on a front surface of a recording paper. At the same time, the main control unit 7 makes the paper transporting/image formation unit 5 form an image of the information on a back surface of the recording paper.

As described above, according to an image forming system S based on an embodiment of the present invention, a method of storing each of a plurality of bit map image data (image formation format data) to each of a plurality of first folders 31, 32 (see FIG. 4), a method of making a conversion to a second bit map image data (second image formation format data) based on an informational data based on a first bit map image data (first image formation format data) and a portion of the informational data (see FIG. 5), and a method of storing a fixed bit map image data (fixed image formation format data) to a second folder 33 in advance (see FIG. 6) may be each used to reduce the amount of time spent to form an image.

A preferable embodiment of the present invention has been described above. However, the present invention is not limited by the above embodiment. Components and configurations may be added, omitted, replaced, and other alterations may be made within the gist of the present invention. For example, the following variations are possible.

(1) In the embodiment described above, the multi functional peripheral A stored the bit map image data. However, the present invention is not limited to this configuration.

The multi functional peripheral A may be configured so that a PDL format data obtained by the information processing device C is not converted to a bit map image data. Instead, the PDL format data may be stored in its original PDL format as an image formation format data (or a first image formation data). When an output instruction is received, the PDL format data may be converted to a bit map image data (or a first bit map image data). Thus, an image formation may be performed based on this bit map image data (or a first bit map image data).

Alternatively, the multi functional peripheral A may be configured so that the text data obtained from the information processing unit C is not converted to a second bit map image data. Instead, the text data is stored in its original form as a second image formation format data. When an output instruction is received, the text data may be converted to the second bit map image data. An image formation may be performed based on this second bit map image data.

Moreover, according to the present embodiment, the information processing device C converts informational data to a PDL format data. Meanwhile, the multi functional peripheral A converts the PDL format data to the bit map image data. However, the present invention is not limited to this configuration. A configuration may be made so that the information processing device C is installed inside the multi functional peripheral A. According to this alternate configuration, the multi functional peripheral A obtains informational data from the transmission server D. This informational data is converted to a bit map image data (or a PDL format data). This bit map image data (or the PDL format data) is stored. When an output instruction is received, an image formation may be performed based on the bit map image data (or a bit map image data converted from the PDL format data). In addition, the information processing device C may be configured so that, when informational data is obtained from the transmission server D, this informational data is converted to a bit map image data, and this bit map image data is outputted to the multi functional peripheral A.

(2) According to the above embodiment, informational data is obtained from the transmission server D. However, the present invention is not limited by this configuration. For example, informational data may be obtained from an external memory medium such as a USB memory.

(3) According to the above embodiment, a method of storing each of a plurality of bit map image data (image formation format data) to each of a plurality of first folders 31, 32 (see FIG. 4), a method of making a conversion to a second bit map image data (second image formation format data) based on an informational data based on a first bit map image data (first image formation format data) and a portion of the informational data (see FIG. 5), and a method of storing a fixed bit map image data (fixed image formation format data) to a second folder 33 in advance (see FIG. 6) are each used in its singular form. However, the present invention is not limited to this configuration. Each of the methods may be combined in various ways.

The present invention is not limited by the embodiments described above. The present invention is instead limited by the attached claims.

What is claimed is:

1. An image forming apparatus comprising:
an operation unit receiving an operation instruction;
an image forming unit performing an image formation;
a control unit making the image forming unit perform the image formation when the operation unit receives an image formation instruction;
a data acquisition unit obtaining an image formation object data;
a data conversion unit converting the image formation object data to a first image formation format data, and converting a portion of the image formation object data to a second image formation format data; and
one or more of a first memory region configured to store both the first image formation format data and the second image formation format data, wherein
when the data acquisition unit obtains the image formation object data, the control unit makes the data conversion unit make a conversion to the first image formation format data and the second image formation format data based on the image formation object data, the control unit makes the first memory region store both the second image formation format data and the first image formation format data; and
when the operation unit receives the image formation instruction and when the first image formation format data is stored in the first memory region, the control unit makes the image forming unit perform the image formation based on the first image formation format data; and
when the operation unit receives the image formation instruction and when only the second image formation format data is stored in the first memory region, the control unit makes the image forming unit perform the image formation based on the second image formation format data;
a second memory region storing a fixed image formation format data in advance, wherein
when the data acquisition unit obtains the image formation object data, the control unit makes the data conversion unit make a conversion to the second image formation format data and to the first image formation format data based on the image formation object data, the control unit makes the first memory region store both the second image formation format data and the first image formation format data; and
when the operation unit receives the image formation instruction and when the first image formation format data is stored in the first memory region, the control unit makes the image forming unit perform the image formation based on the first image formation format data;
when the operation unit receives the image formation instruction and when only the second image formation format data is stored in the first memory region, the control unit makes the image forming unit perform the image formation based on the second image formation format data; and
when the operation unit receives the image formation instruction and when the first image formation format data and the second image formation format data are not stored in the first memory region, the control unit makes the image forming unit perform the image formation based on the fixed image formation format data stored in the second memory region.

2. An image forming apparatus comprising:
an operation unit receiving an operation instruction;
an image forming unit performing an image formation;
a control unit making the image forming unit perform the image formation when the operation unit receives an image formation instruction;
a data acquisition unit obtaining an image formation object data;
a data conversion unit converting the image formation object data to a first image formation format data, and converting a portion of the image formation object data to a second image formation format data;
at least one first memory region storing the first image formation format data and the second image formation format data; and
a second memory region storing a fixed image formation format data in advance, wherein when the data acquisition unit obtains the image formation object data, the control unit makes the data conversion unit make a conversion to the first image formation format data and the second image formation format data based on the image formation object data, the control unit makes the at least one first memory region store the second image formation format data and the first image formation format data; and when the operation unit receives the image formation instruction and when the first image formation format data is stored in the at least one first memory region, the control unit makes the image forming unit perform the image formation based on the first image formation format data;
when the operation unit receives the image formation instruction and when only the second image formation format data is stored in the at least one first memory region, the control unit makes the image forming unit perform the image formation based on the second image formation format data; and
when the operation unit receives the image formation instruction and when the first image formation format data and the second image formation format data are not stored in the at least one first memory region, the control unit makes the image forming unit perform the image formation based on the fixed image formation format data stored in the second memory region.

* * * * *